United States Patent [19]

Kawabe

[11] Patent Number: 4,811,104
[45] Date of Patent: Mar. 7, 1989

[54] NOISE ELIMINATING APPARATUS FOR KEY SIGNAL

[75] Inventor: Shigehisa Kawabe, Tokyo, Japan
[73] Assignee: Nec Corporation, Japan
[21] Appl. No.: 38,245
[22] Filed: Apr. 14, 1987

[30] Foreign Application Priority Data

Apr. 15, 1986 [JP] Japan .................................. 61-87427

[51] Int. Cl.⁴ ..................... H04N 5/213; H04N 5/275; H04N 9/74
[52] U.S. Cl. ..................................... 358/183; 358/22; 358/177; 358/167
[58] Field of Search .................... 358/183, 22, 177, 30, 358/36, 155, 178, 167

[56] References Cited

U.S. PATENT DOCUMENTS 4,628,363 12/1986 Kashiwa .............................. 358/183

Primary Examiner—Tommy P. Chin
Attorney, Agent, or Firm—Ostrolenk, Faber, Gerb & Soffen

[57] ABSTRACT

A noise eliminating apparatus, which may be used in a special effect system for a television video signal, removes noise from an input key signal by inhibiting signal transmission when the signal pulse width is below an arbitrary value. The noise eliminating apparatus includes an arbitrary value generator indicating a noise width to be eliminated. A pulse width detector produces a detection signal when the pulse width of the input key signal exceeds the noise width. A plurality of signal delay circuits are connected in series for sequentially delaying the input key signal. Associated with each delay circuit is a comparator for comparing a respective preselected constant value with the arbitary value and producing a respective coincident signal when such values coincide. A signal inhibitor, such as a logic AND gate, is associated with each delay circuit. The signal inhibitor inhibits the associated delay circuit from delaying the input key signal when the coincident signal is present but the detection signal is absent. With this arrangement, the input key signal following a removed noise signal is transmitted with unaffected width.

6 Claims, 4 Drawing Sheets

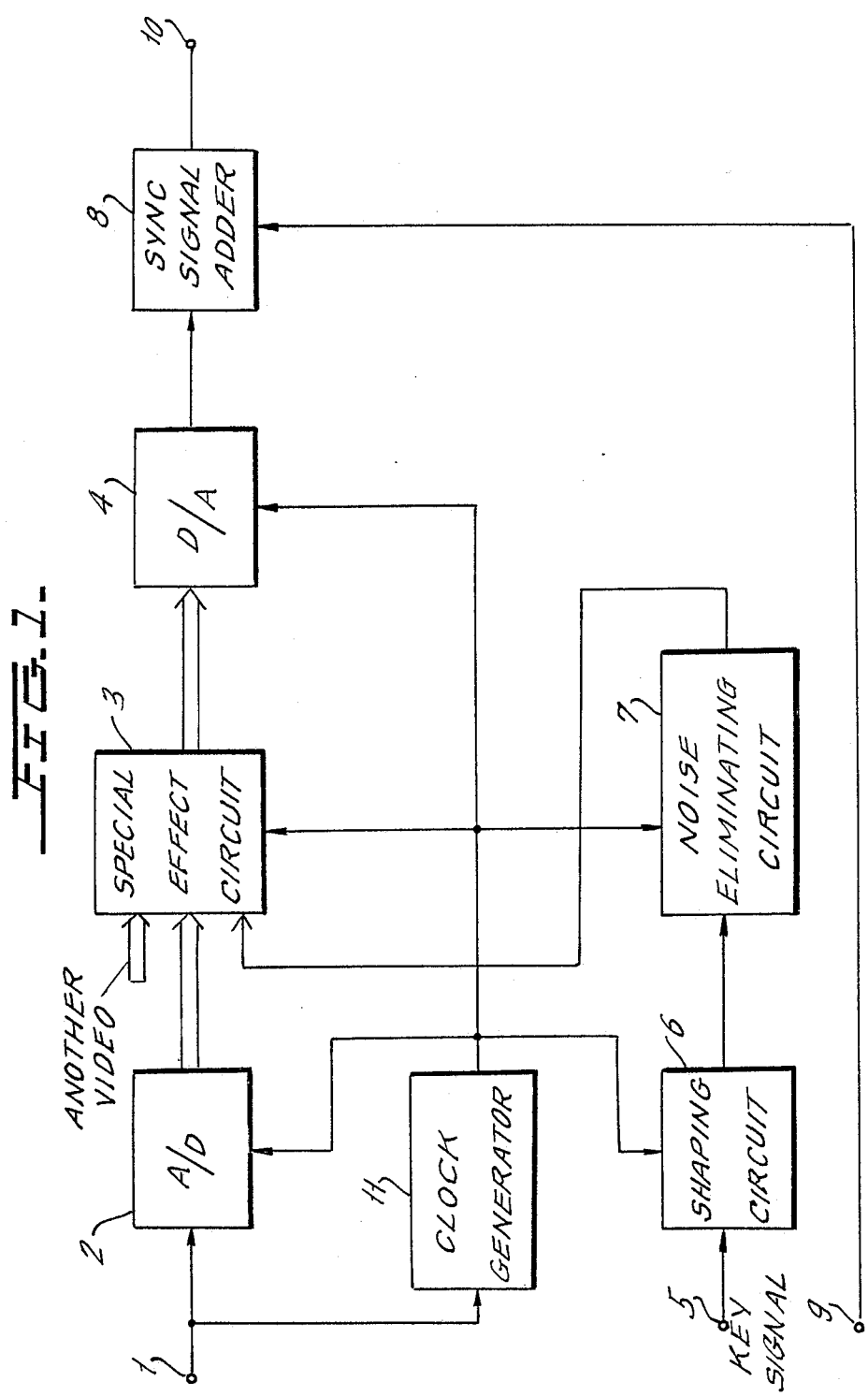

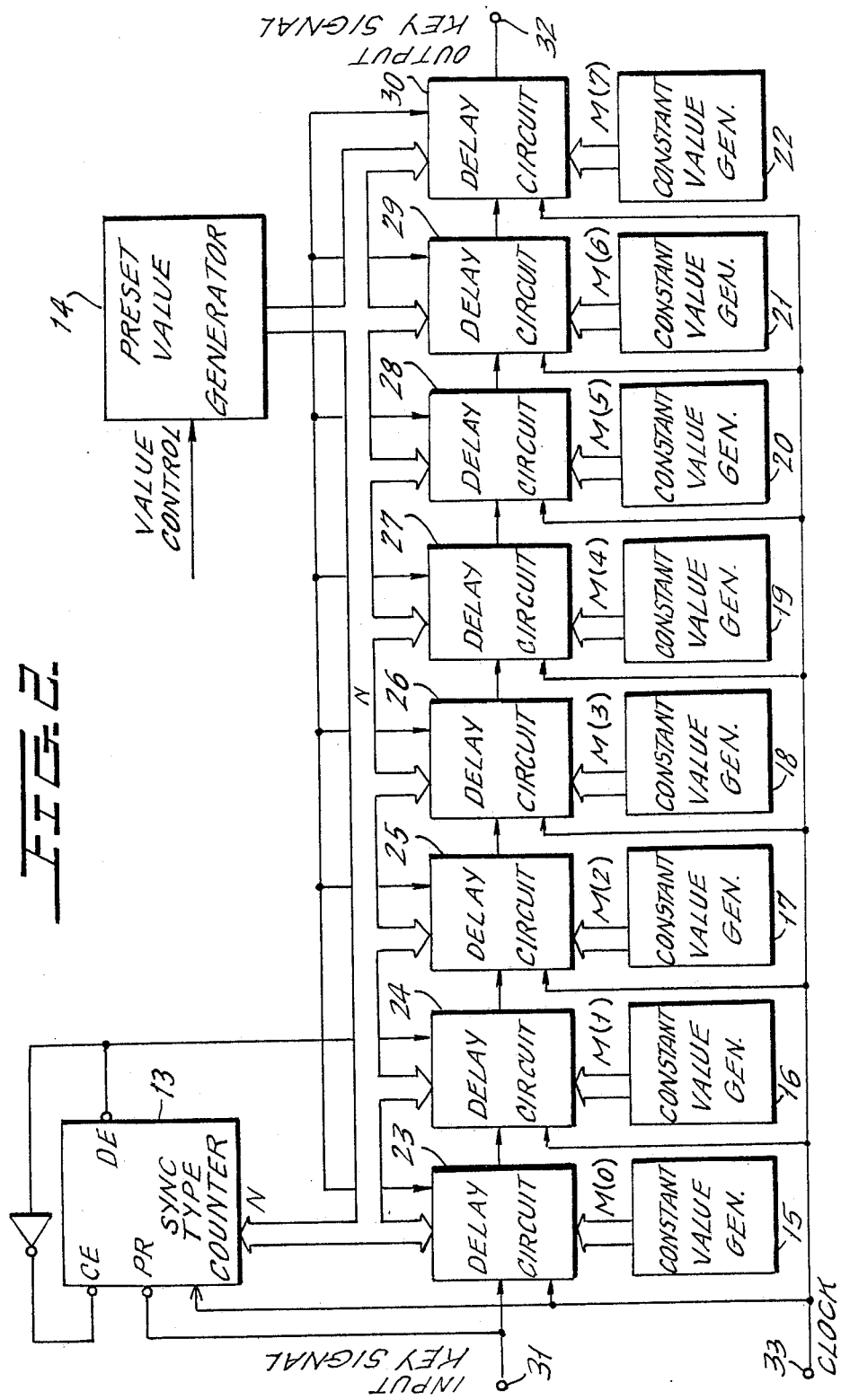

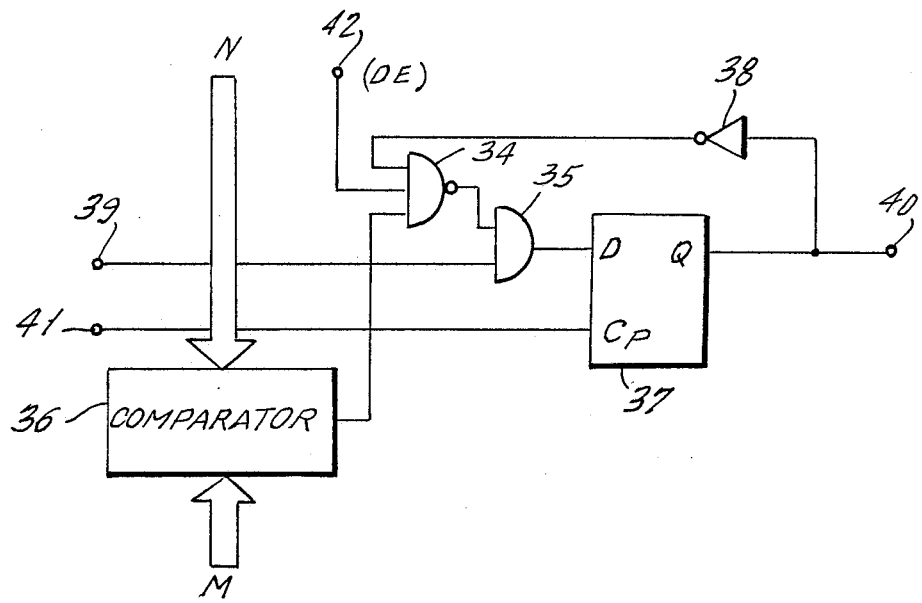
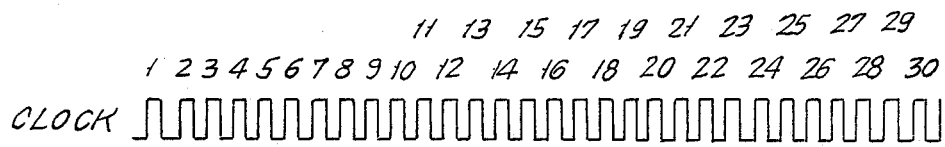
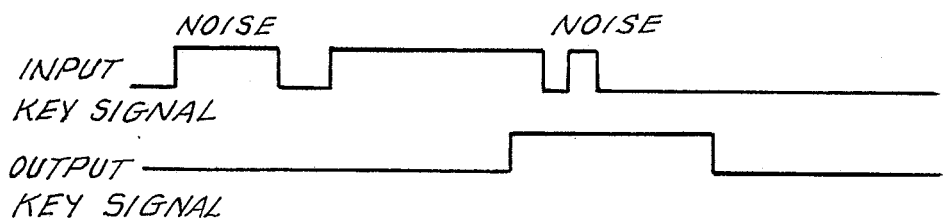

FIG. 5.

| NO. | INPUT KEY SIGNAL | COUNT VALUE | DE | STATE OF D-TYPE FLIP-FLOP ||||||||  OUTPUT KEY SIGNAL |
|---|---|---|---|---|---|---|---|---|---|---|---|---|
| | | | | 23 | 24 | 25 | 26 | 27 | 28 | 29 | 30 | |
| 1 | 0 | 5 | 1 | 0 | 0 | 0 | 0 | 0 | 0 | 0 | 0 | 0 |
| 2 | 1 | 5 | 1 | 1 | 0 | 0 | 0 | 0 | 0 | 0 | 0 | 0 |
| 3 | 1 | 4 | 1 | 1 | 1 | 0 | 0 | 0 | 0 | 0 | 0 | 0 |
| 4 | 1 | 3 | 1 | 1 | 1 | 1 | 0 | 0 | 0 | 0 | 0 | 0 |
| 5 | 1 | 2 | 1 | 1 | 1 | 1 | 1 | 0 | 0 | 0 | 0 | 0 |
| 6 | 0 | 1 | 1 | 0 | 1 | 1 | 1 | 1 | 0 | 0 | 0 | 0 |
| 7 | 0 | 5 | 1 | 0 | 0 | 1 | 1 | 1 | 0 | 0 | 0 | 0 |
| 8 | 1 | 5 | 1 | 1 | 0 | 0 | 1 | 1 | 0 | 0 | 0 | 0 |
| 9 | 1 | 4 | 1 | 1 | 1 | 0 | 0 | 1 | 0 | 0 | 0 | 0 |
| 10 | 1 | 3 | 1 | 1 | 1 | 1 | 0 | 0 | 0 | 0 | 0 | 0 |
| 11 | 1 | 2 | 1 | 1 | 1 | 1 | 1 | 0 | 0 | 0 | 0 | 0 |
| 12 | 1 | 1 | 1 | 1 | 1 | 1 | 1 | 1 | 0 | 0 | 0 | 0 |
| 13 | 1 | 0 | 0 | 1 | 1 | 1 | 1 | 1 | 1 | 0 | 0 | 0 |
| 14 | 1 | 0 | 0 | 1 | 1 | 1 | 1 | 1 | 1 | 1 | 0 | 0 |
| 15 | 1 | 0 | 0 | 1 | 1 | 1 | 1 | 1 | 1 | 1 | 1 | 1 |
| 16 | 0 | 0 | 0 | 0 | 1 | 1 | 1 | 1 | 1 | 1 | 1 | 1 |
| 17 | 1 | 5 | 1 | 1 | 0 | 1 | 1 | 1 | 1 | 1 | 1 | 1 |
| 18 | 0 | 4 | 1 | 0 | 1 | 0 | 1 | 1 | 1 | 1 | 1 | 1 |
| 19 | 0 | 5 | 1 | 0 | 0 | 1 | 0 | 1 | 1 | 1 | 1 | 1 |
| 20 | 0 | 5 | 1 | 0 | 0 | 0 | 1 | 0 | 1 | 1 | 1 | 1 |
| 21 | 0 | 5 | 1 | 0 | 0 | 0 | 0 | 1 | 0 | 1 | 1 | 1 |
| 22 | 0 | 5 | 1 | 0 | 0 | 0 | 0 | 0 | 0 | 0 | 1 | 1 |
| 23 | 0 | 5 | 1 | 0 | 0 | 0 | 0 | 0 | 0 | 0 | 0 | 0 |
| 24 | 0 | 5 | 1 | 0 | 0 | 0 | 0 | 0 | 0 | 0 | 0 | 0 |
| 25 | 0 | 5 | 1 | 0 | 0 | 0 | 0 | 0 | 0 | 0 | 0 | 0 |
| 26 | 0 | 5 | 1 | 0 | 0 | 0 | 0 | 0 | 0 | 0 | 0 | 0 |
| 27 | 0 | 5 | 1 | 0 | 0 | 0 | 0 | 0 | 0 | 0 | 0 | 0 |
| 28 | 0 | 5 | 1 | 0 | 0 | 0 | 0 | 0 | 0 | 0 | 0 | 0 |
| 29 | 0 | 5 | 1 | 0 | 0 | 0 | 0 | 0 | 0 | 0 | 0 | 0 |

NOISE ELIMINATING APPARATUS FOR KEY SIGNAL

BACKGROUND OF THE INVENTION

The present invention relates to a special effect system for a television signal and, more particularly, to an apparatus for eliminating a noise component from a key signal used in the special effect system.

In a television special effect system, a plurality of video signals are combined together using a key signal, such as a chroma-key signal. In a special effect system employing a chroma-key signal, an input video signal is variously compressed in accordance with the width of an input key signal, and the compressed input video signal is combined with another video signal. When a noise component is included in the key signal, however, not only does the combined picture frame become distorted, but also the input video signal is not properly compressed, and the desired special effect is not realized.

A conventional approach to remove a noise component in a key signal is to remove a pulse component in the key signal having a pulse width narrower than a predetermined width. One such noise eliminating technique is disclosed in U.S. Pat. No. 4,628,363, entitled "Chroma-key Tracking Apparatus". In this technique, the pulse width of a pulse component of a key signal is measured by counting clock pulses during such pulse width, and when the counted value is less than a predetermined value, the pulse component is treated as noise and removed by closing a gate. The disclosed technique suffers, however, by narrowing the width of the output key signal occurring just after the noise removal. This necessitates processing to enlarge the affected output key signal.

SUMMARY OF THE INVENTION

It is, therefore, an object of the present invention to provide an apparatus for eliminating a noise component from a key signal in which there is no change in the width of an output key signal after the noise removal.

The present invention provides an apparatus for eliminating a noise component from an input key signal, which includes a plurality of delay circuits connected in series, each of which delays the input signal by a clock pulse. The apparatus also includes a circuit for generating a preset value indicating the number of clock pulses corresponding to a pulse width which is to be removed as a noise component. A down-counter counts down one value from the preset value for each clock pulse when a pulse is ongoing in the input key signal. A respective comparator is associated with each of the plurality of delay circuits for comparing the associated constant value with the preset value of the preset value generating circuit. The apparatus includes transmitting means in the form of gates, one for each delay circuit. Each gate inhibits the input key signal when the comparator produces a coincidence output except when a detection output of logic "1" is produced by the counter.

BRIEF DESCRIPTION OF THE DRAWINGS

FIG. 1 is a block diagram of a television special effect system including a noise eliminating apparatus according to the present invention;

FIG. 2 is a block diagram of an embodiment of the present invention;

FIG. 3 is a circuit diagram showing the arrangement of a delay circuit illustrated in FIG. 2;

FIG. 4 is a timing chart for explaining the operation of the present invention; and FIG. 5 is a table showing states of signals at various portions of the present embodiment of the invention, illustrating operation of the embodiment.

DESCRIPTION OF THE PREFERRED EMBODIMENT

FIG. 1 shows one example of a special effect system for a television video signal including a noise eliminating apparatus according to the present invention. In FIG. 1, an analog television video signal input from an input terminal 1 is encoded by an A/D converter 2 into a digital signal of, for example, 8 bits and then supplied to a special effect processing circuit 3, a key signal is input from an input terminal 5, passed through a shaping circuit 6 and then supplied to a noise eliminating apparatus 7 according to the present invention in which a noise component is removed. In the shaping circuit 6, the input key signal is compared with a predetermined threshold level at the timing of a clock to deliver a shaped binary key signal. The key signal delivered from the noise eliminating apparatus 7 is supplied to the circuit 3 for special effect processing. The resulting special effect television signal from the circuit 3 is then decoded into an analog television signal by a D/A converter 4 and supplied to a synchronizing signal adding circuit 8 in which a synchronizing signal, supplied from a terminal 9, is added to the analog television signal to obtain a standard television video signal which is then produced on an output terminal 10. A clock generator 11 generates clock pulses for controlling the time of operation of each of blocks 2, 3, 4, 6 and 7.

FIG. 2 shows one embodiment of the noise eliminating apparatus of FIG. 1. As illustrated, the embodiment includes a key signal input terminal 31, a key signal output terminal 32, a clock input terminal 33, eight equivalent delay circuits 23, 24, 25, 26, 27, 28, 29 and 30, eight constant value generators 15, 16, 17, 18, 19, 20, 21 and 22 respectively generating constants M (e.g., 0, 1, 2, 3, 4, 5, 6 and 7), a preset value generator 14 generating any desired value from "0" to "7" corresponding to the pulse width of noise to be removed, and a down-counter 13. The down-counter 13 has a count enable input CE synchronized with a clock, a preset input PR synchronized with a clock, a preset data input of 3 bits, and a detection output DE which is a logical state "1" when the count value reaches zero.

In the embodiment shown in FIG. 2, the pulse width of a noise component to be removed is selected by changing the present value N (0 to 7) generated by the preset value generator 14. If, for example, "5" is generated as the preset value N, any pulse component having a pulse width narrower than five clock pulses is removed as noise from the input key signal. If the generator 14 generates "0" as the preset value, no eliminating operation is carried out.

The down-counter 13, which detects the pulse width of the input key signal, is arranged such that when the input key signal is present (i.e. logical state "1"), the counter 13 counts down one value from the preset value N for each clock pulse. When the counter value becomes zero, the counter 13 produces a detection output DE (i.e., a logical state "0"). The down-counter 13 is reset to the preset value when the input key signal is at logic "0".

The eight delay circuits 23 to 30 are basically arranged to successively transfer the input key signal while delaying it by an amount corresponding to one clock pulse per stage in response to a clock signal on line 33. However, the transfer of the key signal is inhibited when the constant value M set in each stage is equal to the preset value N devliered from the preset value generator 14, except, however, when the detection output is produced by the down-counter 13.

FIG. 3 shows in detail the arrangement of a representative one of delay circuits 23 to 30. The delay circuit includes a comparator 36 which compres the preset value N and the constant value M (one of 0 to 7) set in the corresponding one of the constant value generators 15 to 22. Comparator 36 outputs a "coincident" signal having a logical state "1" when the values of N and M are the same. Each delay circuit further includes an input terminal 39 through which a key signal is input, an output terminal 40, a clock input terminal 41, and a gate input terminal 42 which receives the detection output signal DE from the down-counter 13. The delay circuit futher includes an inverter 38, a NAND gate 34 which receives the output of the comparator 36, the signal on gate input terminal 42 and the output of the inverter 38; and AND gate 35 which receives the key signal from the input terminal 39 and the output of the NAND gate 34; and a D type flip-flop 37 which has an input terminal D connected to the output of the AND gate 35, a clock input terminal Cp connected to the clock input terminal 41 and an output terminal Q connected to the output terminal 40 and to inverter 38.

Returning to FIG. 2, when the binary key signal containing a noise component is supplied to the input terminal 31, the count value of the down-counter 13 is decremented by oen for each clock pulse from a preset value "5" to "0". While the count of the counter 13 is decremented, the key signal is transferred through the eight delay circuits 23 to 30 in that order. When the pulse width of the key signal is "5" or greater, the count value of the counter 13 is decremented as far as "0", and the detection output DE is produced. The detection output DE opens the AND gate 35 (FIG. 3) in the delay circuit 28, so that the key signal is transferred to the D type flip-flop 37.

When the pulse width of the key signal is less than "5", the counter 13 is again preset with the preset value of "5" before the key signal is transferred to the delay circuit 28, and no detection output DE is produced by the counter 13. Accordingly, the AND gate 35 in the delay circuit 28 is closed, and a pulse component with a width narrower than "5" is eliminated.

For example, in FIG. 3, when the coincidence output is produced by comparator 36 and no detection output DE is produced on line 42 by the down-counter 13, the gate 35 is closed, so that the input key signal is not transmitted. Accordingly, each of the serially-arranged delay circuits 23 to 30 (FIG. 2) inhibits a noise component whose pulse width is narrower than the associated constant value M clock pulses. If, for example, the value N generated by the preset value generator 14 is "5", a pulse component whose width is narrower than five clock pulses is removed by delay circuit 28. On the other hand, if the pulse width of the input key signal corresponds to five or more clock pulses, the detection output is delivered from the downcounter 13 to open the AND gate 35, so that the key signal is transmitted to a subsequent stage.

FIG. 4 is a timing chart for explaining the operation of the embodiment of the present invention, and FIG. 5 is a table for explaining the relationship between the input key signal, the count value of the down-counter 13, the respective outputs of the D flip-flops in the delay circuits 23 to 30, and the output key signal.

Although eight delay circuits are provided in the aforementioned embodiment, if a pulse width to be eliminated as a noise component is wider than eight clock pulses, it suffices to correspondingly increase the number of delay circuits and to employ a down-counter 13 capable of counting down from the correspondingly increased number.

As has been described above, it is possible, according to the present invention, to eliminate a noise component contained in a key signal without narrowing the next key signal. This is preferably accomplished by combining a counter to measure pulse width of the key signal with a plurality of delay circuits each including a gate and each responsive to a respective constant value of a pulse width to be removed.

I claim:

1. An apparatus for eliminating a noise component from an input key signal, comprising:
   means for generating an arbitrary value indicating a noise width to be eliminated;
   means for detecting the pulse width of the input key signal and producing a detection signal when the pulse width exceeds the noise width;
   a plurality of delay means connected in series for sequentially delaying the input key signal;
   means for generating a plurality of ordered values respectively associated with said plurality of delay means;
   a plurality of comparator means respectively associated with said plurality of delay means for comparing the arbitrary value with the respective associated ordered value and producing respective coincidence signals; and
   a plurality of inhibiting means respectively associated with said plurality of delay means for inhibiting transmission of the input key signal in the corresponding delay means, said inhibiting means each being responsive to a respective one of said associated coincidence signals and to lack of the detection signal.

2. A noise eliminating apparatus as claimed in claim 1, wherein said delay means includes a D type flip-flop and a gate controlling the setting of the flip-flop.

3. An apparatus for eliminating a noise component from an input key signal, comprising:
   a plurality of delay means connected in series for sequentially delaying the input key signal, each said delay means including a gate;
   means for generating an arbitrary value corresponding to the width of a noise pulse to be removed;
   means for removing an inhibition to the closing of one of the gates included in said plurality of delay means in accordance with the arbitrary value;
   means for measuring pulse width of the input key signal and producing a detection signal when the pulse width exceeds the noise pulse width to be removed; and
   means for removing an inhibition to the opening of the gate closed by said closing means in response to the detection signal produced by said measuring means.

4. An apparatus for eliminating a noise component in an input key signal, comprising:
- means for setting a first value corresponding to a pulse width to be eliminated as noise;
- means counting down clock pulses from the first value when the input key signal contains a pulse and providing a detection signal when the count reaches zero;
- a plurality of delay means connected in series for delaying the input key signal by units of said clock pulses;
- a plurality of comparator means respectively associated with said plurality of delay means, respectively, each comparator means being for comparing the first value with a respective one of a plurality of second values, the plurality of second values being predetermined in order corresponding to the serial placement of said plurality of delay means; and
- a plurality of gate means respectively associated with said plurality of delay means, each said gate means being disposed before the corresponding delay means to inhibit the transfer of said input key signal when a coincidence output is produced by the corresponding comparator means except when said counting means produces said detection signal.

5. A noise eliminating apparatus as claimed in claim 4, wherein said plurality of second values are arranged as "0", "1", "2", and so on in correspondence with the first to the last of the series of said plurality of delay means.

6. A noise component eliminator for use in a special effect system for a television video signal for removing a noise component in an input key signal, said eliminator comprising:
- an input terminal for receiving an input key signal;
- an output terminal for delivering an output key signal;
- a clock generator for generating clock pulses;
- preset value generator means for arbitrarily generating any one of values "0", "1", and so on through "(n−1)" as a preset value;
- a down-counter for decrementing its count value from the preset value in response to the clock pulses during the presence of said input key signal, said down-counter delivering a detection output signal when said count value reaches zero;
- first, second, and so on through n-th delay circuits sequentially connected in series to transmit the input key signal from said input terminal toward said output terminal, each said delay circuit including a gate;
- constant value generating means for generating constant values "0", "1", and so on through "(n−1)" associated with said first, second, and so on through n-th delay circuits, respectively; and
- first, second, and so on through n-th comparator means associated with said first, second, and so on through n-th delay circuits, respectively, for comparing the associated constant values with said preset value to generate a coincidence signal, wherein the respective gate included in each said delay means is closed in response to said coincidence signal and lack of the detection output signal.

* * * * *